United States Patent
Kurian et al.

(10) Patent No.: US 9,619,447 B2
(45) Date of Patent: Apr. 11, 2017

(54) CONVERTING TERMINAL-BASED LEGACY APPLICATIONS TO WEB-BASED APPLICATIONS

(71) Applicant: International Business Machines Corporation, Armonk, NY (US)

(72) Inventors: John Kurian, Bangalore (IN); Jithesh Moothoor, Bangalore (IN); Amith Nagabhushan, Bangalore (IN); Hariharan N. Venkitachalam, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 14/332,418

(22) Filed: Jul. 16, 2014

(65) Prior Publication Data

US 2016/0019191 A1   Jan. 21, 2016

(51) Int. Cl.
*G06F 17/22* (2006.01)
*G06F 17/21* (2006.01)
*G06F 17/30* (2006.01)
*H04L 29/08* (2006.01)

(52) U.S. Cl.
CPC ........ *G06F 17/2247* (2013.01); *G06F 17/211* (2013.01); *G06F 17/30914* (2013.01); *H04L 67/02* (2013.01)

(58) Field of Classification Search
CPC .................................................. G06F 17/2247
See application file for complete search history.

(56) References Cited

U.S. PATENT DOCUMENTS 6,067,579 A    5/2000  Hardman et al.
6,510,468 B1   1/2003  Hayne
6,981,257 B2  12/2005  Teubner
(Continued)

OTHER PUBLICATIONS

Sneed, H.M., "COB2WEB a Toolset for Migrating to Web Services," Web Site Evolution, 2008, WSE 200, 10th International Symposium on, pp. 19-25, Oct. 3-4, 2008, Beijing, China, ISSN: 1550-4441, Print ISBN: 978-1-4244-2790-1, Inspec Accession No. 10369807, DOI: 10.1109/WSE.2008.4655391.
(Continued)

*Primary Examiner* — Peiyong Weng
(74) *Attorney, Agent, or Firm* — Mark G. Edwards (57) ABSTRACT

Map files associated with a terminal-based legacy application, such as a Customer Information Control System (CICS) application, are converted to views and models of a web-based application, such as an application implemented with a Java Platform Enterprise Edition (JEE) compliant server. A hybrid application server executes the legacy application in a first runtime, such as a CICS runtime, in response to a user request received through the web-based application executing in a second runtime, such as a JEE runtime. When a terminal command is identified in the executing legacy application, data associated with the terminal command is packetized and forwarded to the web-based application through an established socket without creating a data stream. The web-based application invokes the models associated with the terminal command and presents a web page responsive to the terminal command to the user.

13 Claims, 5 Drawing Sheets

(56) References Cited

U.S. PATENT DOCUMENTS

| | | | |
|---|---|---|---|
| 7,246,146 B1 * | 7/2007 | Ims | G06F 17/211 |
| | | | 707/E17.117 |
| 7,904,803 B2 | 3/2011 | Coulthard et al. | |
| 8,069,435 B1 | 11/2011 | Lai | |
| 8,156,250 B2 | 4/2012 | Parcher et al. | |
| 8,201,193 B2 | 6/2012 | Ho et al. | |

OTHER PUBLICATIONS

Sneed, H.M., "Using XML to Integrate Existing Software Systems into the Web," Computer Software and Applications Conference, 2002, COMPSAC 2002, Proceedings 26th Annual International, pp. 167-172, ISSN: 0730-3157, Print ISBN: 0-7695-1727-7, INSPEC Accession No. 7456093, DOI: 10.1109/CMPSAC.2002.1044548.

Kurian et al., "Converting Terminal-Based Legacy Applications to Web-Based Applications," U.S. Appl. No. 14/608,326, filed Jan. 29, 2015.

IBM, "List of IBM Patents or Patent Applications Treated as Related."

* cited by examiner

CONVERTING TERMINAL-BASED LEGACY APPLICATIONS TO WEB-BASED APPLICATIONS

BACKGROUND

The present disclosure relates to computer applications, and more specifically relates to converting terminal-based legacy computer applications to web-based applications without creating data streams and without requiring a change to the legacy application code.

Many thousands or more applications have been designed for use with terminals such as the IBM 3270. The IBM 3270 is a class of block-oriented computer terminal normally used to communicate with IBM mainframe computers. These terminals are sometimes referred to as "green screens" due to the text color on the original models. In contrast with a character-oriented terminal, a block-oriented terminal may transfer large blocks of data (known as "data streams") to minimize the number of input/output (I/O) interrupts required. Data streams include both text and formatting functions, allowing an entire terminal screen to be presented as a single output operation. Formatting functions allow the terminal screen to be divided into clusters of contiguous character cells with various attributes. Data streams may include functions that send data for display at the terminal and functions that retrieve data input at the terminal.

SUMMARY

Disclosed herein are embodiments of a method, a computer program product, and a computer system for accessing a legacy application with a web-based application interface although the legacy application was designed for being accessed with a terminal-based application interface. A map file associated with the legacy application may define terminal operations for the legacy application. Terminal commands in the legacy application may be associated with creating data streams. In some embodiments, the legacy application may be a Customer Information Control System (CICS) application, the map files may be CICS Basic Mapping Support (CICS BMS) maps, and the web-based application interface may be implemented with a Java Platform Enterprise Edition (JEE) compliant server.

A request may be received from a user through a web-based application interface to invoke the legacy application. Execution of the legacy application is invoked in response to receiving the request. When a terminal command associated with a data stream is identified in the executing legacy application, a web page responsive to the terminal command is identified and presented to the user without creating the data stream. The identified web page may be a result of converting a map file of the legacy application to corresponding web modules executing in the JEE runtime.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer applications, and more particular aspects relate to converting terminal-based legacy computer applications to web-based applications without requiring a change to the legacy application code. While the present disclosure is not necessarily limited to such applications, various aspects of the disclosure may be appreciated through a discussion of various examples using this context.

Many users of legacy applications that were designed using a terminal-based application interface would like to access these legacy applications through a web-based application interface without making any code changes to the legacy applications. Disclosed herein is a methodology to convert a terminal-based legacy application for use with a web-based server, such as a Java Platform Enterprise Edition (JEE) compliant server, without requiring to interpret data streams and without requiring any changes to the legacy application code. The methodology embraces the web-based presentation interfaces enabling other modes of systems of engagement. The methodology also provides for subsequent additions and modifications to the legacy application through the web-based technologies without having to modify and/or create terminal commands, thus essentially discarding the legacy terminal usage and replacing it with web-based technologies. All of this happens without the creation and use of data streams associated with terminal commands in the legacy applications.

Figure 1:
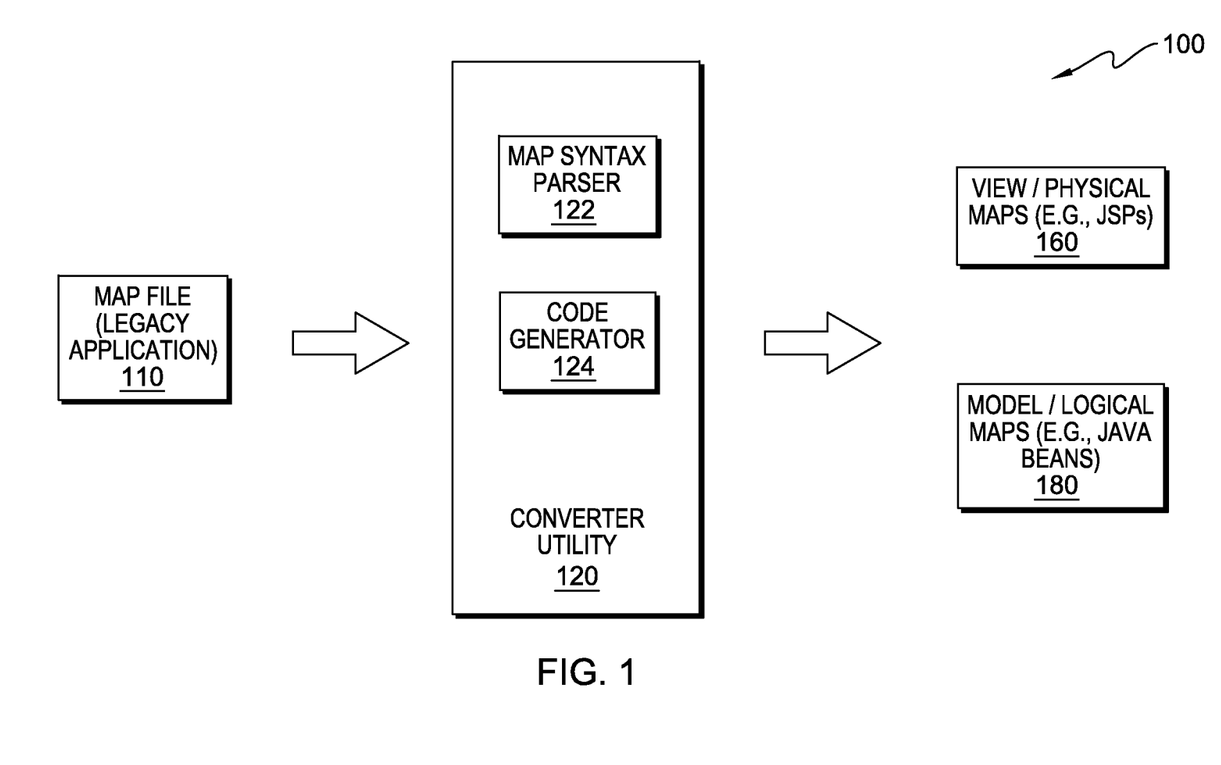
FIG. 1 is a block diagram of an example system for converting map files of a legacy application to physical maps (views) and logical maps (models) of a web-based application.

FIG. 1 is a block diagram of an example system 100 for converting a map file 110 of a legacy application to physical maps (views) 160 and logical maps (models) 180 of a web-based application interface. The converter utility 120 receives the map file 110 as input and produces physical maps 160 and logical maps 180 as output. The converter utility 120 includes a map syntax parser 122 and a code generator 124. The converter utility 120 may be a stand-alone utility. The physical maps 160 and logical maps 180 may then be used to emulate terminal operations in the legacy application via a web interface.

The map file 110 defines the screen format associated with terminal commands in the legacy application. This may be accomplished with assembler macros that generate both a physical map and a symbolic, or logical, map. The physical map may be a load module in a load library associated with the legacy application. The symbolic map may be a structure definition copied into the legacy application source code. Map syntax parser 122 parses the data in map file 110 and code generator 124 produces web-based code for physical maps 160 and logical maps 180 that preserves the functionality represented by map file 110.

In some embodiments, converter utility 120 may convert a Customer Information Control System Basic Mapping Support (CICS BMS) map 110 to JavaServer Pages (JSP) 160 and JavaBeans 180. CICS BMS is an interface for the "green screens" based on 3270 terminal standards. JSP is a technology for creating dynamically generated web pages based on HTML, XML, or other document types. JavaBeans is a component architecture for modular construction of applications. The JSPs and JavaBeans may then be deployed as part of a web module. The JSPs represent the view part (physical map) of the CICS BMS map, and can be used to present a web page. The JavaBeans represent the model part (symbolic map) of the CICS BMS map, and can be used to work with the data that needs to be either displayed to a user or provided to the legacy application.

Figure 2:
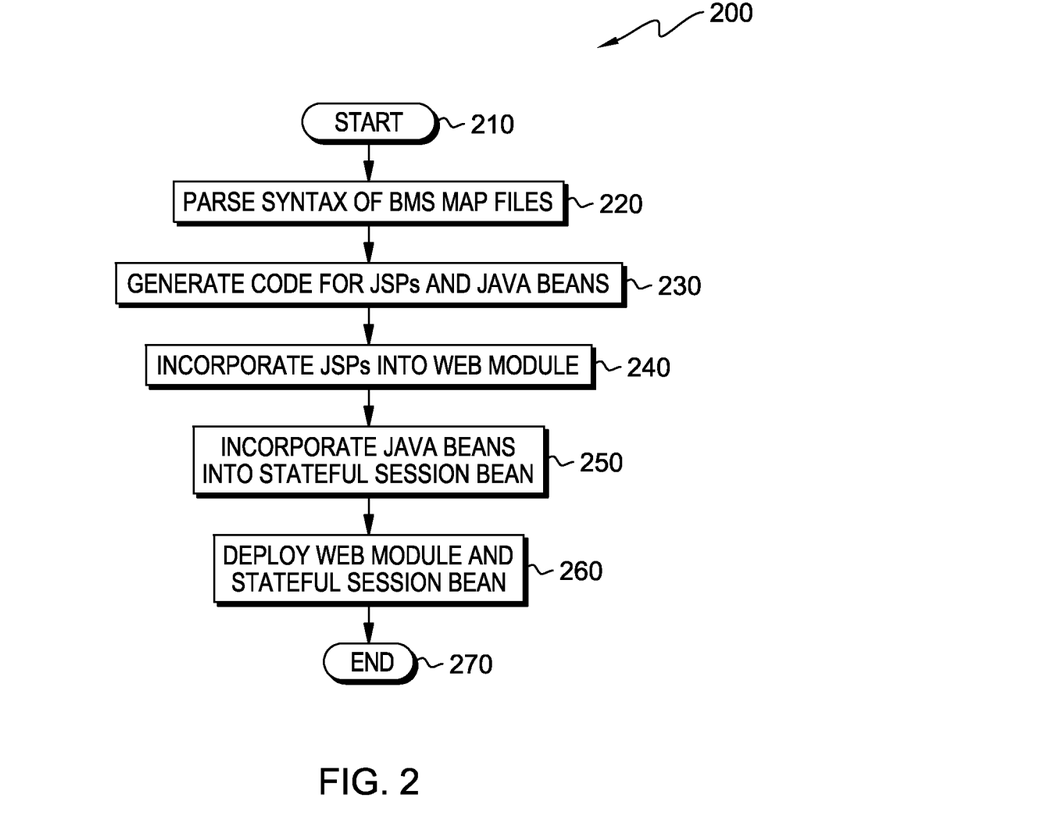
FIG. 2 is a flow diagram of an example method for converting map files of a legacy application to physical maps (views) and logical maps (models) of a web-based application.

FIG. 2 is a flow diagram of an example method 200 for converting a map file of a legacy application to physical maps (views) and logical maps (models) of a web-based application interface. In the embodiment of method 200, the map file of the legacy application is a CICS BMS map file, the physical map of the web-based application interface are JSPs, and the logical map of the web-based application interface are JavaBeans. From start 210, the map syntax parser parses the syntax of the BMS map file at 220 to determine the functionality represented in the BMS map file. At 230, the code generator generates code, for example XML or other web-based code, that preserves the functionality represented by the BMS map file. In this manner, the BMS map file is converted to JSPs and JavaBeans. In some embodiments, the parsing and code generating represented by processes 220 and 230 may be performed in a combined manner rather than as separate processes.

At 240, the JSPs are incorporated into a web module and at 250, the JavaBeans are incorporated into a stateful session bean. The stateful session bean is an object having a state. In other words, the stateful session bean keeps track of which client it is dealing with throughout a session and thus access to the bean instance is limited to only one client at a time. At 260 the web module and the stateful session bean are deployed, and the method ends at 270.

Figure 3:
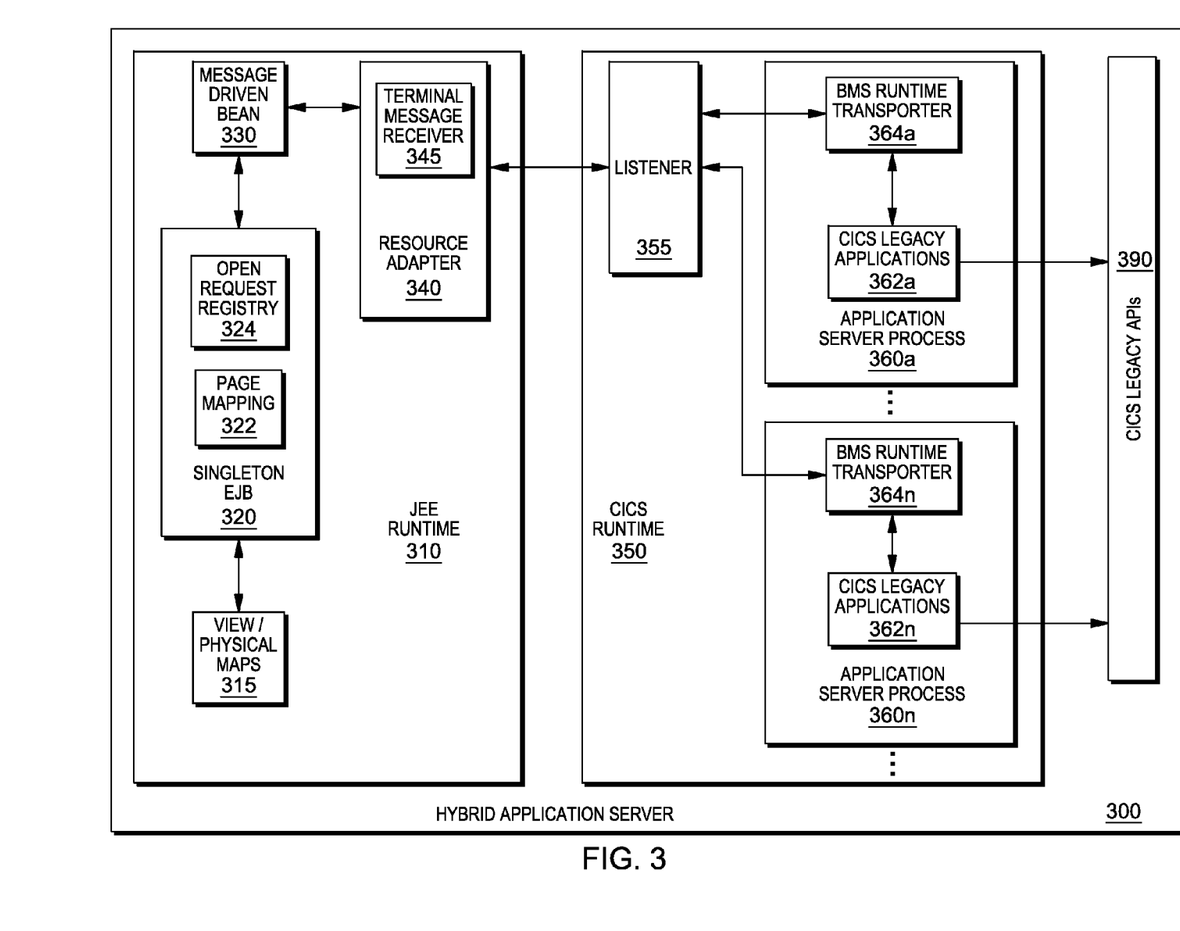
FIG. 3 is block diagram of an example system for responding to terminal commands from a legacy application with an appropriate web-based operation.

FIG. 3 is block diagram of an example hybrid application server 300 for responding to terminal commands from a legacy application with an appropriate web-based operation. In this disclosure, "terminal command" is used to broadly identify any communication from the legacy application directed to a terminal process, including at least commands, requests, calls and messages. Terminal commands are typically associated with data streams.

In the embodiment shown, one or more CICS legacy applications 362 run within a CICS application server process 360. The CICS application server process 360 is middleware designed to support rapid, high-volume online transaction processing. Legacy applications 362 are associated with CICS legacy Application Programming Interfaces (APIs) 390.

JEE runtime 310 is a web-based application interface to the legacy applications 362 and includes the physical maps (views) 315 and logical maps (models) that provide the functionality of the BMS map files associated with the legacy applications 362. These components may have been produced by a converter utility, such as the converter utility described above. Singleton session bean 320 is a stateful session bean incorporating the JavaBeans that make up the logical maps (models). Singleton session bean 320 acts as a gateway between the JEE runtime 310 and the CICS runtime 350.

The open request registry 324 is a subcomponent of the singleton session bean 320. Any JEE module that wants to send a request to the CICS runtime 350 must look up the open request registry session bean 324 and invoke its method to submit the request. This allows the stateful session bean 320 to keep track of all open requests.

Page mapping 322 is also a subcomponent of the singleton session bean 320. When a map file is converted into JSPs, for example with the converter utility described above, classes are generated that facilitate mapping the "map, mapset" names of the legacy map file to corresponding JSPs. These classes are used by the stateful session bean 320 to select the proper JSPs in response to terminal commands from the legacy application 362.

Listener 355 (or socket) is responsible for detecting any requests coming from the JEE runtime 310 to the CICS runtime 350. When such a request is detected, the listener 355 forwards the request to one of the application server processes 360. Any application server process 360n which is available may process the request.

The BMS runtime transporter 364 is a layer between the legacy applications 362 running in the application server process 360 and the listener 355. Whenever a CICS legacy application 362 sends a terminal command, the data associated with the terminal command is sent to the BMS runtime transporter 364. The BMS runtime transporter 364 creates a data structure containing the packet data representing the legacy map file details. The BMS runtime transporter 364 will forward this data packet to the already established socket connection with the JEE Connector Architecture (JCA) counterpart, through the message inflow contract, via the listener 355. Terminal message receiver 345 in the resource adapter 340 represents this JCA counterpart. Message driven bean 330 implements the message receiver 345 interface of the resource adapter 340. Whenever there is a terminal related message delivered from the CICS runtime 350, the resource adapter 340 invokes the message driven bean 330.

Although hybrid application server 300 depicts an implementation using the inflow contract of the JCA specification, other embodiments may use other methods that provide for informing the components in the JEE runtime 310 about the data and controls in terminal commands encountered by the CICS runtime 350. For example, a simple protocol may be implemented using TCP/IP sockets.

The packet data in the data structure created by the BMS runtime transporter 364 contains the data that would have been included in a data stream in the original terminal-based application process. By creating a data structure containing the packet data and forwarding the packet to the JEE runtime 310, the need for creating and working with a data stream is eliminated, providing a much more modern and lightweight infrastructure and runtime. There is no dependency on the applications maintaining data streams.

Figure 4:
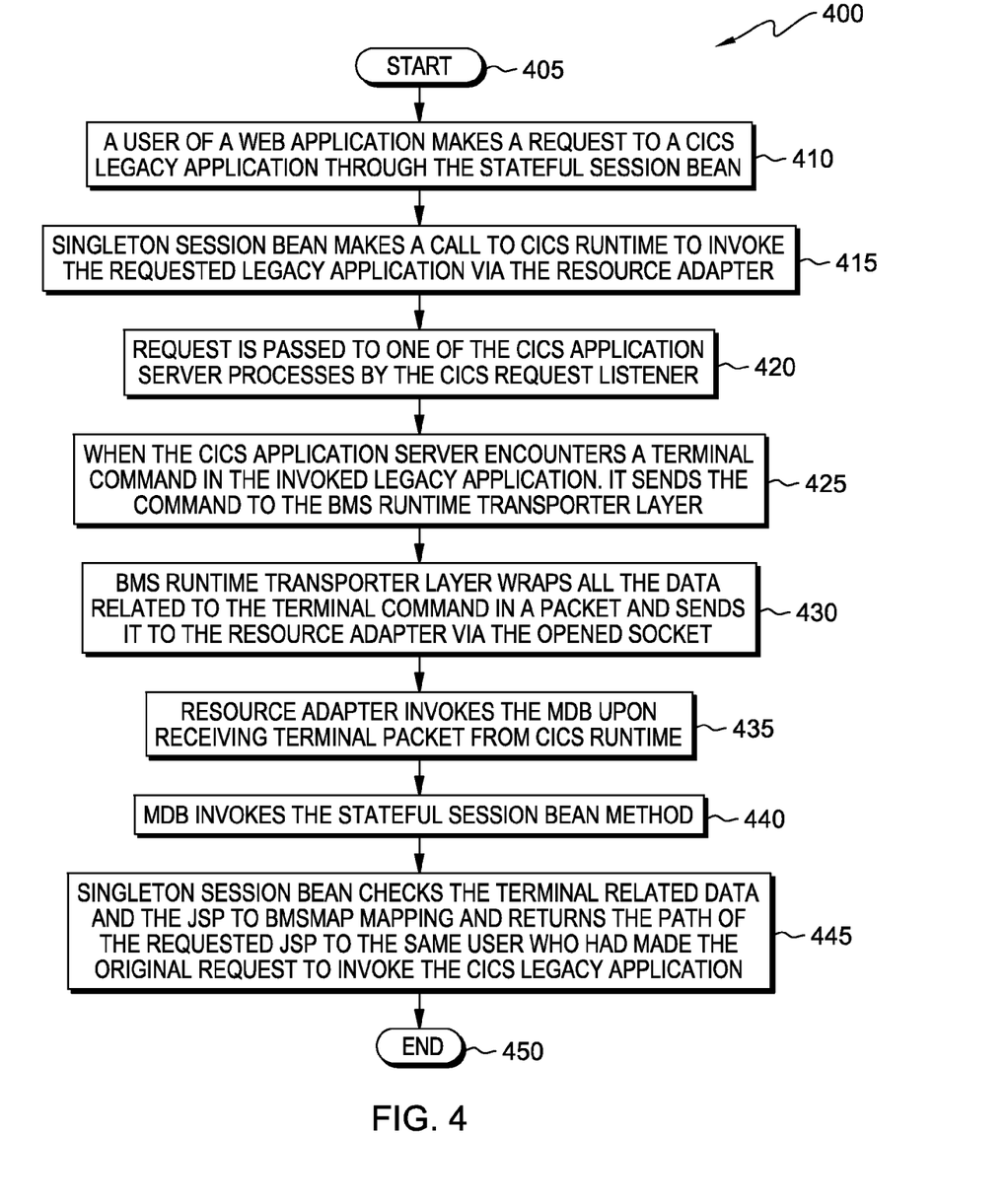
FIG. 4 is a flow diagram of an example method for responding to terminal commands from a legacy application with an appropriate web-based operation.

FIG. 4 is a flow diagram of an example method 400 for responding to terminal commands from a legacy application with an appropriate web-based operation. In this disclosure, "terminal command" is used to broadly identify any communication from the legacy application directed to a terminal process, including at least commands, requests, calls and messages. Terminal commands are typically associated with data streams.

From start 405, a user of a web application may make a request to a CICS legacy application through the stateful session bean at 410. At 415, the singleton session bean may make a call to the CICS runtime to invoke the requested CICS legacy application via the resource adapter. The request may then be passed at 420 to an available CICS application server process by the CICS request listener.

At 425, when the CICS application server encounters a terminal command in the invoked legacy application, the CICS application server may send the terminal command to the BMS runtime transporter layer. At 430, the BMS runtime transporter layer may wrap the data associated with the terminal command in a packet and may send the data to the resource adapter in the JEE runtime via the opened socket. The packet data contains the data that would have been included in a data stream in the original terminal-based application process. By creating a data packet and forwarding the packet to the JEE runtime 310, the need for creating and working with a data stream is eliminated, providing a much more modern and lightweight infrastructure and runtime. There is no requirement that the legacy applications maintain data streams.

At 435, the resource adapter may invoke the message driven bean upon receiving the data packet from the CICS runtime. The message driven bean may then invoke the stateful session bean method at 440. The singleton session bean may inspect the received data packet containing terminal-related data and the JSP-to-BMS page mapping at 445. After determining which JSP is being requested, the singleton session bean may return the path of the requested JSP to the user. If the legacy application expects a response to the terminal command, data may be retrieved from the JSP and included in a response to the legacy application. The method ends at 450.

Figure 5:
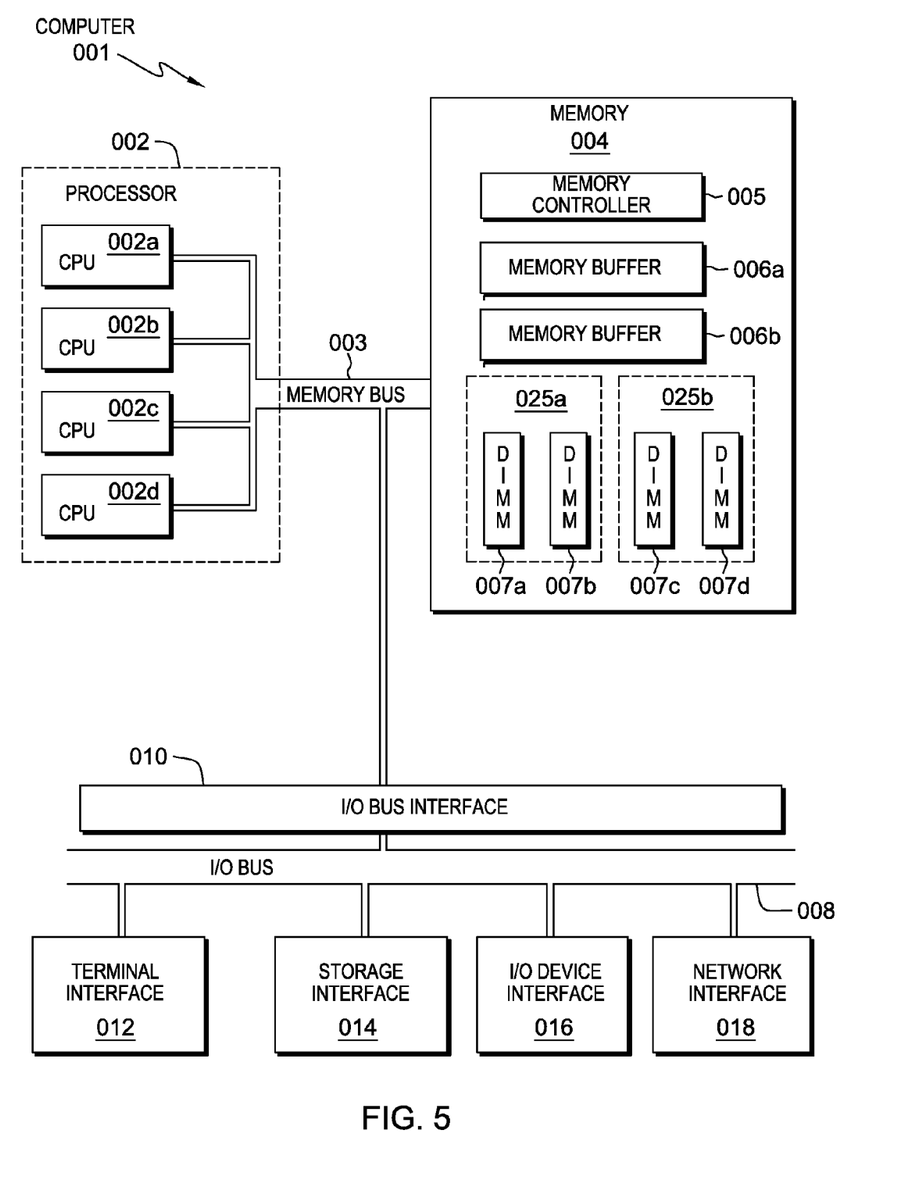
FIG. 5 is a high-level block diagram of an example system for implementing one or more embodiments of the invention.

FIG. 5 depicts a high-level block diagram of an example system for implementing one or more embodiments of the invention. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffers 006 and one or more memory devices 007. In the illustrated embodiment, the memory devices 007 may be dual in-line memory modules (DIMMs), which are a series of dynamic random-access memory (DRAM) chips mounted on a printed circuit board and designed for use in personal computers, workstations, and servers. The use of DRAMs is exemplary only and the memory array used may vary in type as previously mentioned. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 5 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 5 is intended to depict the representative major components of an exemplary computer system 001. But individual components may have greater complexity than represented in FIG. 5, components other than or in addition to those shown in FIG. 5 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be an intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even DRAM may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for interfacing with a legacy application through a web-based application interface, the legacy application designed for a terminal-based application interface, the computer program product comprising a non-transitory computer readable storage medium having program instructions embodied therewith, the program instructions executable by a processor to perform a method comprising:

receiving, from a user through the web-based application interface, a request to execute the legacy application, wherein the legacy application is a software application designed to interface with a block-oriented computer terminal using terminal commands and associated map files to generate data streams, the map files associating each of the terminal commands with a terminal format and a set of one or more terminal input and output operations, and the data streams being blocks of data having terminal input and output operations and text for generating entire terminal displays in a single operation;

executing, in response to receiving the request, the legacy application in a software abstraction layer of a computing system, wherein the software abstraction layer provides an interface for identifying terminal commands in the executing legacy application;

identifying, during execution of the legacy application, a terminal command issued by the executing legacy application;

identifying, without creating a data stream associated with the terminal command, a first web page of the web-based application interface, the first web page responsive to the terminal command, the first web page being a result of converting at least one map file of the legacy application; and presenting the first web page to the user.

2. The computer program product of claim 1, wherein the method further comprises:

converting the at least one map file of the legacy application to a plurality of web pages of the web-based application interface.

3. The computer program product of claim 2, wherein the converting comprises:

receiving the at least one map file of the legacy application;

parsing data from the at least one map file, the parsing identifying functionality represented by the at least one map file; and generating web-based code for physical maps and logical maps, the physical maps and logical maps preserving the functionality.

4. The computer program product of claim 1, wherein the legacy application is a Customer Information Control System (CICS) application, and wherein the at least one map file of the legacy application is a CICS Basic Mapping Support (CICS BMS) map.

5. The computer program product of claim 1, wherein the web-based application interface is implemented with a Java Platform Enterprise Edition (JEE) compliant server.

6. The computer program product of claim 1, wherein the legacy application executes in a first runtime and wherein the web-based application interface executes in a second runtime, wherein the method further comprises:

establishing a socket between the first runtime and the second runtime;

creating, within the first runtime, a data packet containing data associated with the terminal command; and forwarding the data packet to the second runtime through the established socket.

7. The computer program product of claim 6, wherein the executing legacy application expects a response to the terminal command, wherein the method further comprises:

retrieving data from the first web page;

creating, within the second runtime, the response, the response including the data; and forwarding the response to the first runtime through the established socket.

8. A computer system for interfacing with a legacy application through a web-based application interface, the legacy application designed for a terminal-based application interface, the computer system comprising:

a memory; and a processor in communication with the memory, wherein the computer system is configured to perform a method, the method comprising:

receiving, from a user through the web-based application interface, a request to execute the legacy application, wherein the legacy application is a software application designed to interface with a block-oriented computer terminal using terminal commands and associated map files to generate data streams, the map files associating each of the terminal commands with a terminal format and a set of one or more terminal input and output operations, and data streams are blocks of data having terminal input and output operations and text for generating entire terminal displays in a single operation;

executing, in response to receiving the request, the legacy application in a software abstraction layer of a computing system, wherein the software abstraction layer provides an interface for identifying terminal commands in the executing legacy application;

identifying, during execution of the legacy application, a terminal command issued by the executing legacy application;

identifying, without creating a data stream associated with the terminal command, a first web page of the web-based application interface, the first web page responsive to the terminal command, the first web page being a result of converting at least one map file of the legacy application; and presenting the first web page to the user.

9. The computer system of claim 8, wherein the method further comprises:

converting the at least one map file of the legacy application to a plurality of web pages of the web-based application interface.

10. The computer system of claim 9, wherein the converting comprises:

receiving the at least one map file of the legacy application;

parsing data from the at least one map file, the parsing identifying functionality represented by the at least one map file; and generating web-based code for physical maps and logical maps, the physical maps and logical maps preserving the functionality.

11. The computer system of claim 8, wherein the legacy application is a Customer Information Control System (CICS) application, and wherein the at least one map file of the legacy application is a CICS Basic Mapping Support (CICS BMS) map.

12. The computer system of claim 8, wherein the web-based application interface is implemented with a Java Platform Enterprise Edition (JEE) compliant server.

13. The computer system of claim 8, wherein the legacy application executes in a first runtime and wherein the web-based application interface executes in a second runtime, wherein the method further comprises:

establishing a socket between the first runtime and the second runtime;

creating, within the first runtime, a data packet containing data associated with the terminal command; and forwarding the data packet to the second runtime through the established socket.

* * * * *